(12) United States Patent
Panteleev et al.

(10) Patent No.: US 9,761,037 B2
(45) Date of Patent: Sep. 12, 2017

(54) GRAPHICS PROCESSING SUBSYSTEM AND METHOD FOR UPDATING VOXEL REPRESENTATION OF A SCENE

(71) Applicant: Nvidia Corporation, Santa Clara, CA (US)

(72) Inventors: Alexey Panteleev, Moscow (RU); Sergey Bolotov, Moscow (RU); Evgeny Makarov, Moscow (RU); Yury Uralsky, Moscow (RU)

(73) Assignee: Nvidia Corporation, Santa Clara, CA (US)

( * ) Notice: Subject to any disclaimer, the term of this patent is extended or adjusted under 35 U.S.C. 154(b) by 72 days.

(21) Appl. No.: 14/160,883

(22) Filed: Jan. 22, 2014

(65) Prior Publication Data

US 2015/0109296 A1     Apr. 23, 2015

Related U.S. Application Data

(60) Provisional application No. 61/892,288, filed on Oct. 17, 2013, provisional application No. 61/892,316, filed on Oct. 17, 2013.

(51) Int. Cl.
  *G06T 15/00*  (2011.01)
  *G06T 15/20*  (2011.01)
  *G06T 15/80*  (2011.01)
  *G06T 15/08*  (2011.01)

(52) U.S. Cl.
  CPC ............ *G06T 15/005* (2013.01); *G06T 15/08* (2013.01); *G06T 15/20* (2013.01); *G06T 15/80* (2013.01)

(58) Field of Classification Search
  None
  See application file for complete search history.

(56) References Cited

U.S. PATENT DOCUMENTS

| | | | |
|---|---|---|---|
| 6,567,083 B1 | 5/2003 | Baum et al. | |
| 7,528,839 B1 * | 5/2009 | Cunniff | G06T 5/20 345/420 |
| 2002/0145611 A1 * | 10/2002 | Dye | G09G 5/14 345/543 |
| 2003/0122819 A1 * | 7/2003 | Koneru | G06T 11/40 345/421 |

(Continued)

OTHER PUBLICATIONS

Crassin, Cyril, et al. "Interactive indirect illumination using voxel cone tracing." Computer Graphics Forum. vol. 30. No. 7. Blackwell Publishing Ltd, 2011.*

(Continued)

*Primary Examiner* — Yu Chen
(74) *Attorney, Agent, or Firm* — Kevin Brown; Parker Justiss, P.C.

(57) ABSTRACT

A graphics processing subsystem and method for updating a voxel representation of a scene. One embodiment of the graphics processing subsystem includes: (1) a memory configured to store a voxel representation of a scene having first and second regions to be updated, and (2) a graphics processing unit (GPU) operable to: (2a) unify the first and second regions into a bounding region if a volume thereof does not exceed summed volumes of the first and second regions by more than a tolerance, and (2b) generate voxels for the bounding region and cause the voxels to be stored in the voxel representation.

17 Claims, 3 Drawing Sheets

(56) References Cited

U.S. PATENT DOCUMENTS

| | | | | |
|---|---|---|---|---|
| 2004/0008212 A1* | 1/2004 | O'Neill | ............ | G06T 9/001 345/628 |
| 2010/0091310 A1* | 4/2010 | Thomas | ............ | G06T 11/60 358/1.9 |
| 2010/0182323 A1* | 7/2010 | Nuydens | ............ | G06T 17/20 345/441 |
| 2014/0125653 A1* | 5/2014 | Massarwa | ............ | G06T 17/00 345/419 |
| 2014/0321704 A1* | 10/2014 | Partis | ............ | G06K 9/00771 382/103 |

OTHER PUBLICATIONS

Tanner, Christopher C., Christopher J. Migdal, and Michael T. Jones. "The clipmap: a virtual mipmap." Proceedings of the 25th annual conference on Computer graphics and interactive techniques. ACM, 1998.*

Hur, et al. "Voxel-based Global Illumination", Computer Graphics and Image Processing Laboratory, SNU [No date], 35 pages based on paper Thiedemann, Sinje, et al. "Voxel-based global illumination." Symposium on Interactive 3D Graphics and Games. ACM, 2011.

Thiedemann, Sinje, et al. "Voxel-based global illumination." Symposium on Interactive 3D Graphics and Games. ACM, 2011.

Williams, Lance. "Pyramidal Parametrics." ACM Siggraph Computer Graphics. vol. 17. No. 3. ACM, 1983.

Forest, V., et al., "Real-Time Hierarchical Binary-Scene Voxelization," A K Peters Ltd., 2010, 14 pages.

Reinbothe, C. K., et al., "Hybrid Ambient Occlusion," Eurographics, 2009, 7 pages.

Lengyel, E., "Voxel-Based Terrain for Real-Time Virtual Simulations," Committee in Charge, 2010, 95 pages.

Whigham, J., "Goodbye Octrees," Jun. 18, 2013, http://johnwhigham.blogspot.com/2013/06/goodbye-octrees.html, Aug. 27, 2015, 4 pages.

Microsoft "Shader Stages (Direct3D 10)," http://web.archive.org/web/20111128061221/http://msdn.microsoft.com/en-us/library/windows/desktop/bb205146(v=vs.85), Nov. 28, 2011, 4 pages.

* cited by examiner

GRAPHICS PROCESSING SUBSYSTEM AND METHOD FOR UPDATING VOXEL REPRESENTATION OF A SCENE

CROSS-REFERENCE TO RELATED APPLICATION

This application claims the benefit of U.S. Provisional Application Ser. No. 61/892,288, filed by Bolotov, et al., on Oct. 17, 2013, entitled "A Method for Optimizing Regions for Voxelization Updates," and U.S. Provisional Application Ser. No. 61/892,316, filed by Bolotov, et al., on Oct. 17, 2013, entitled "Using Clipmaps to Represent Volumetric Data for GI and AO Algorithms," commonly assigned with this application and incorporated herein by reference.

TECHNICAL FIELD

This application is directed, in general, to a graphics processing subsystem and, more specifically, to carrying out an update to a voxel representation of a scene.

BACKGROUND

Many computer graphic images are created by mathematically modeling the interaction of light with a three dimensional (3D) scene from a given viewpoint. This process, called "rendering," generates a two-dimensional (2D) image of the scene from the given viewpoint, and is analogous to taking a photograph of a real-world scene.

As the demand for computer graphics, and in particular for real-time computer graphics, has increased, computer systems with graphics processing subsystems adapted to accelerate the rendering process have become widespread. In these computer systems, the rendering process is divided between a computer's general purpose central processing unit (CPU) and the graphics processing subsystem, architecturally centered about a graphics processing unit (GPU). Typically, the CPU performs high-level operations, such as determining the position, motion, and collision of objects in a given scene. From these high-level operations, the CPU generates a set of rendering commands and data defining the desired rendered image or images. For example, rendering commands and data can define scene geometry, lighting, shading, texturing, motion, and/or camera parameters for a scene. The graphics processing subsystem creates one or more rendered images from the set of rendering commands and data.

Scene geometry is typically represented by geometric primitives, such as points, lines, polygons (for example, triangles and quadrilaterals), and curved surfaces, defined by one or more two- or three-dimensional vertices. Each vertex may have additional scalar or vector attributes used to determine qualities such as the color, transparency, lighting, shading, and animation of the vertex and its associated geometric primitives.

Many graphics processing subsystems are highly programmable through an application programming interface (API), enabling complicated lighting and shading algorithms, among other things, to be implemented. To exploit this programmability, applications can include one or more graphics processing subsystem programs, which are executed by the graphics processing subsystem in parallel with a main program executed by the CPU. Although not confined merely to implementing shading and lighting algorithms, these graphics processing subsystem programs are often referred to as "shading programs," "programmable shaders," or simply "shaders."

A variety of shading programs are directed at modeling illumination in a scene. The physical plausibility of rendered illumination often depends on the application, more specifically, whether or not the rendering is done in real-time. Physically plausible illumination at real-time frame rates is often achieved using approximations. For example, ambient occlusion is a popular approximation because of its high speed and simple implementation. Another example is directional occlusion. Many algorithms can only approximate direct illumination, which is light coming directly from a light source.

Global illumination, or GI, is a concept that accounts for both direct illumination and indirect illumination, which is light that reflects off other surfaces, in rendering the scene. In doing so, a significantly more realistic image is achievable. However, real-time global illumination remains problematic for large and dynamic scenes. Efforts to mitigate the latency introduced by these comprehensive illumination algorithms are ongoing. For example, some algorithms partially pre-compute illumination. Another example is instant radiosity, which models indirect lighting as a set of point lights, the contributions of which are accumulated over multiple rendering passes. Yet another approach is to limit indirect lighting to a single bounce, under the assumption that one-bounce indirect illumination is sufficiently realistic. Still, real-time frame rates are typically only achievable through approximations.

Ambient occlusion, or AO, is an example of a shading algorithm, commonly used to add a global illumination look to rendered images. AO is not a natural lighting or shading phenomenon. In an ideal system, each light source would be modeled to determine precisely the surfaces it illuminates and the intensity at which it illuminates them, taking into account reflections, refractions, scattering, dispersion and occlusions. In computer graphics, this analysis is accomplished by ray tracing or "ray casting." The paths of individual rays of light are traced throughout the scene, colliding and reflecting off various surfaces.

In non-real-time applications, each surface in the scene can be tested for intersection with each ray of light, producing a high degree of visual realism. This presents a practical problem for real-time graphics processing: rendered scenes are often very complex, incorporating many light sources and many surfaces, such that modeling each light source becomes computationally overwhelming and introduces large amounts of latency into the rendering process. AO algorithms address the problem by modeling light sources with respect to an occluded surface in a scene: as white hemispherical lights of a specified radius, centered on the surface and oriented with a normal vector at the occluded surface. Surfaces inside the hemisphere cast shadows on other surfaces. AO algorithms approximate the degree of occlusion caused by the surfaces, resulting in concave areas such as creases or holes appearing darker than exposed areas. AO gives a sense of shape and depth in an otherwise "flat-looking" scene.

The most realistic AO techniques are global; the illumination at each point is a function of other geometry in the scene. Screen-space AO (SSAO) can render only local effects and therefore fails to recognize the more subtle illuminations that lend realism. For this reason, SSAO will not be further described herein.

Several methods are available to compute global AO, but its sheer computational intensity makes it an unjustifiable luxury for most real-time graphics processing systems. To appreciate the magnitude of the effort AO entails, consider a given point on a surface in the scene and a corresponding hemispherical normal-oriented light source surrounding it. The illumination of the point is approximated by integrating the light reaching the point over the hemispherical area. The fraction of light reaching the point is a function of the degree to which other surfaces obstruct each ray of light extending from the surface of the sphere to the point.

SUMMARY

One aspect provides a graphics processing subsystem. In one embodiment, the subsystem includes: (1) a memory configured to store a voxel representation of a scene having first and second regions to be updated, and (2) a graphics processing unit (GPU) operable to: (2a) unify the first and second regions into a bounding region if a volume thereof does not exceed summed volumes of the first and second regions by more than a tolerance, and (2b) generate voxels for the bounding region and cause the voxels to be stored in the voxel representation.

Another aspect provides a method of updating a voxel representation of a scene. In one embodiment, the method includes: (1) comparing a summed volume and a bounding region volume for a pair of regions in the scene that require an update, (2) testing if the pair should be unified into a bounding region, and (3) voxelizing the bounding region, thereby updating the voxel representation.

Yet another aspect provides computing system. In one embodiment, the system includes: (1) a memory configured to store a three-dimensional (3D) clipmap data structure having a plurality of levels of detail (LODs) for representing a scene, (2) a central processing unit (CPU) operable to execute an application configured to generate an original list of a plurality of regions of the scene that require an update, and (3) a GPU operable to: (3a) evaluate a difference between a summed volume and a bounding region volume for each combination pair of regions in the original list, (3b) unify a pair of regions into a bounding region if a corresponding difference is indicative that a corresponding summed volume exceeds a corresponding bounding region volume, (3c) modify the original list into a new list that includes the bounding region and excludes the pair, and (3d) voxelize the bounding region into the 3D clipmap data structure.

BRIEF DESCRIPTION

Reference is now made to the following descriptions taken in conjunction with the accompanying drawings, in which.

DETAILED DESCRIPTION

Figure 1:
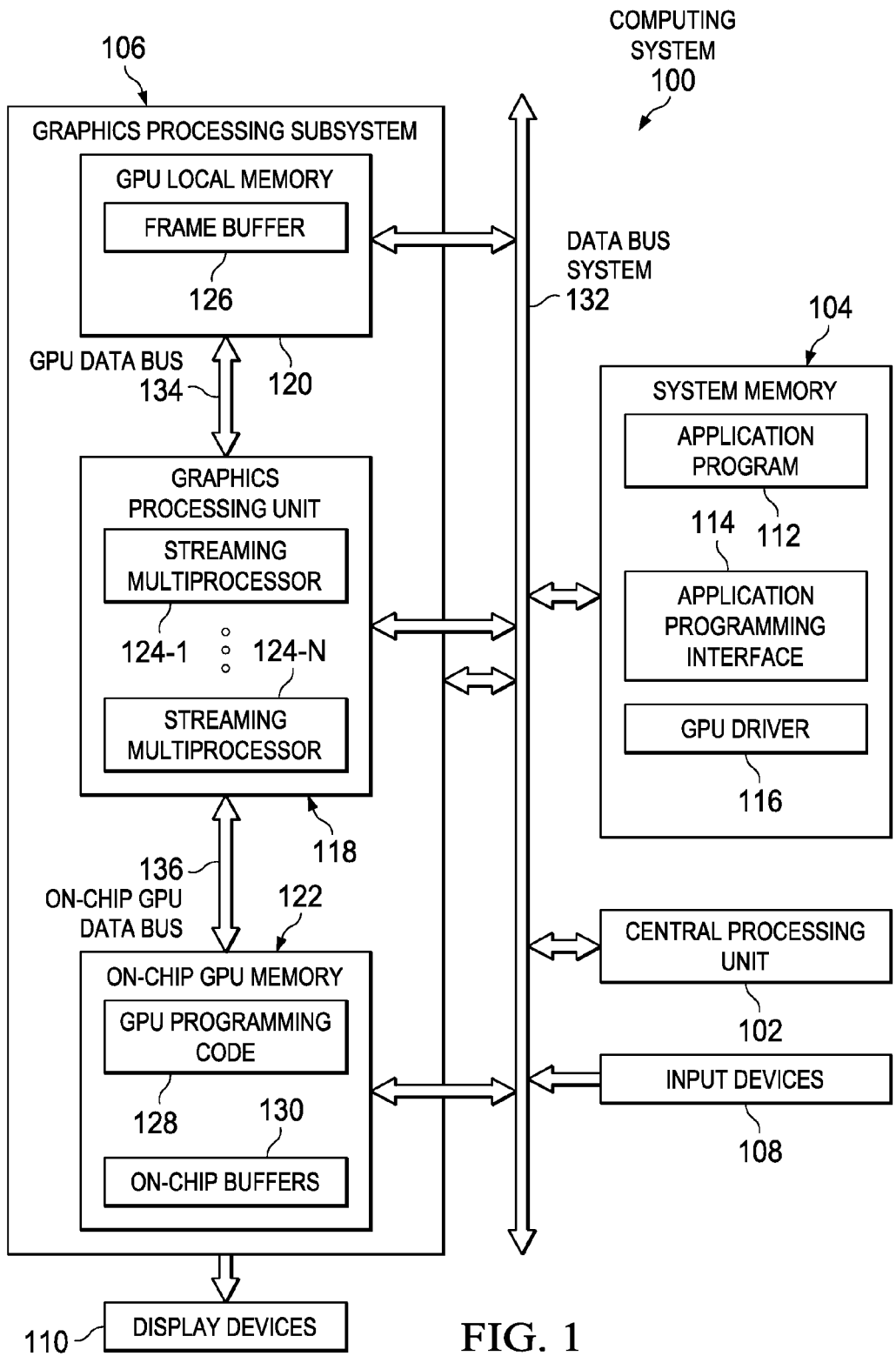
FIG. 1 is a block diagram of one embodiment of a computing system.
Figure 2A:
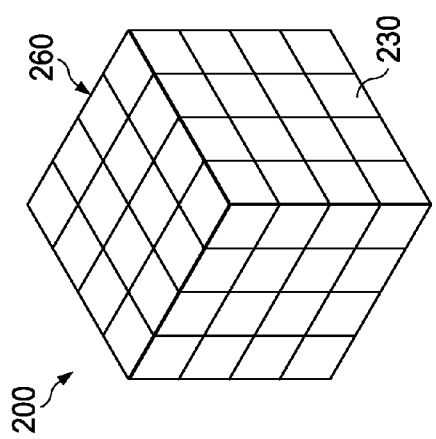
FIGS. 2A-2E are illustrative diagrams of one embodiment of a 3D clipmap.
Figure 2B:
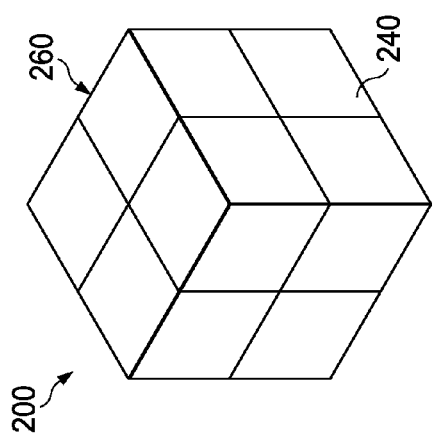
Figure 2C:
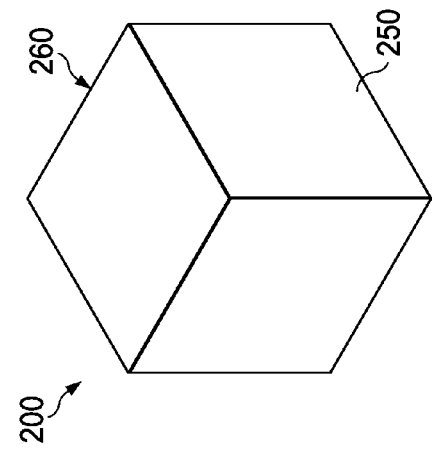
Figure 2D:
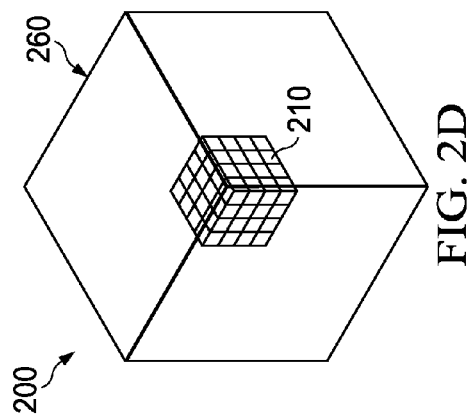
Figure 2E:
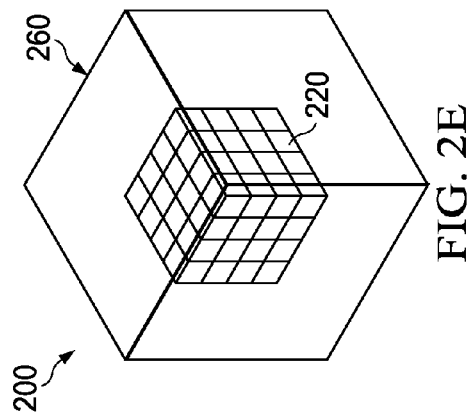

A mipmap is a collection of correlated images of increasingly reduced resolution. "Mip" is actually an acronym representing the Latin phrase "multum in parvo," meaning "much in little." Mipmaps are often described as resolution pyramids, starting with level zero, the largest and finest level. Each lower level represents the image using half as many texels in each dimension. Consequently, for a two-dimensional (2D) image, each lower level consumes one-quarter of the memory required for the level above. For a 3D scene, each lower level consumes one-eighth the memory required for the level above. Rendering processes can gain access to the various levels of detail (LODs) to use the texels contained therein to render an image. Mipmaps are intended to increase rendering speed and reduce aliasing.

A clipmap is a representation of a partial mipmap in which the finest levels are clipped to a specified maximum size. Rather than the pyramidal shape seen in mipmaps, the clipmap more resembles an obelisk. Clipped levels are referred to as clip levels and unclipped levels are referred to as mip levels. A clipmap has at least one mip level and at least one clip level. The mip levels of a clipmap represent the same spatial region of a scene with increasing resolution, beginning with the coarsest level. Each of the clip levels has the same resolution that is equal to the resolution of the finest mip level. While the clip levels maintain a constant resolution across the corresponding LODs, the respective spatial regions represented shrink as the LODs become finer. This representation reduces the memory amount required to represent parts of the scene with high spatial resolution and cover a large region of the scene at the same time.

Clipmaps resulted from the realization that the majority of a mipmap is not used to render a single frame of a scene. In fact, the viewpoint and display resolution determine the part of the mipmap that is used to render a frame. The clipmap is intended to be the minimal subset of the mipmap needed to render each frame. Thus clipmaps should be updated as frames change over time. For this reason, practical clipmaps are updatable.

The clipmap data structure can be expanded to represent volumetric data for a 3D scene in a voxel representation. Volumetric data is packaged in a volumetric pixel, or "voxel." Clipmaps were originally implemented as 2D mipmaps with the finest levels clipped such that they have the same number of texels, but cover different sized spatial regions. A 3D clipmap has advantages over alternative representations, such as a sparse voxel octree or voxel texture, in that it can be updated more quickly and more quickly sampled than an octree.

Clipmaps can be used in many graphics rendering processes, including ambient occlusion (AO) and global illumination (GI). To evaluate a viewpoint in a particular scene, the scene is voxelized to form a clipmap that is centered on or, in some embodiments, slightly offset from, the viewpoint. Generally, when computing an effect on the viewpoint, geometry that is further from the viewpoint has less impact on the computation than nearer geometry. When processing the viewpoint, samples are taken from the various LODs of the clipmap. Nearer samples are taken from the finer LODs, and distant samples are taken from the coarser LODs.

Updating the clipmap quickly is essential to using clipmaps in processes such as AO or GI for large scenes or animated objects. When something changes in the scene, the voxel representation must be updated. A common way to update is to mark the regions that contain the modified objects, erase the contents of those regions, and voxelize new objects into them. It is realized herein that this procedure results in inefficiencies by marking overlapping regions when objects are moved. Of particular concern are instances where objects are moved slightly and the bounding regions for the old location and the new location are marked and processed twice. As the geometry in the scene increases in complexity, the redundancies also scale. It is realized herein that certain of the marked regions to be updated can be combined such that the volume of the new region is not significantly greater than the cumulative volume of the original regions.

FIG. 1 is a block diagram of one embodiment of a computing system 100 in which one or more aspects of the invention may be implemented. The computing system 100 includes a system data bus 132, a central processing unit (CPU) 102, input devices 108, a system memory 104, a graphics processing subsystem 106, and display devices 110. In alternate embodiments, the CPU 102, portions of the graphics processing subsystem 106, the system data bus 132, or any combination thereof, may be integrated into a single processing unit.

Further, the functionality of the graphics processing subsystem 106 may be included in a chipset or in some other type of special purpose processing unit or co-processor.

As shown, the system data bus 132 connects the CPU 102, the input devices 108, the system memory 104, and the graphics processing subsystem 106. In alternate embodiments, the system memory 100 may connect directly to the CPU 102. The CPU 102 receives user input from the input devices 108, executes programming instructions stored in the system memory 104, operates on data stored in the system memory 104, and configures the graphics processing subsystem 106 to perform specific tasks in the graphics pipeline. The system memory 104 typically includes dynamic random-access memory (DRAM) employed to store programming instructions and data for processing by the CPU 102 and the graphics processing subsystem 106. The graphics processing subsystem 106 receives instructions transmitted by the CPU 102 and processes the instructions in order to render and display graphics images on the display devices 110.

As also shown, the system memory 104 includes an application program 112, an application programming interface (API) 114, and a graphics processing unit (GPU) driver 116. The application program 112 generates calls to the API 114 in order to produce a desired set of results, typically in the form of a sequence of graphics images. The application program 112 also transmits zero or more high-level shading programs to the API 114 for processing within the GPU driver 116. The high-level shading programs are typically source code text of high-level programming instructions that are designed to operate on one or more shading engines within the graphics processing subsystem 106. The API 114 functionality is typically implemented within the GPU driver 116. The GPU driver 116 is configured to translate the high-level shading programs into machine code shading programs that are typically optimized for a specific type of shading engine (e.g., vertex, geometry, or fragment).

The graphics processing subsystem 106 includes a graphics processing unit (GPU) 118, an on-chip GPU memory 122, an on-chip GPU data bus 136, a GPU local memory 120, and a GPU data bus 134. The GPU 118 is configured to communicate with the on-chip GPU memory 122 via the on-chip GPU data bus 136 and with the GPU local memory 120 via the GPU data bus 134. The GPU 118 may receive instructions transmitted by the CPU 102, process the instructions in order to render graphics data and images, and store these images in the GPU local memory 120. Subsequently, the GPU 118 may display certain graphics images stored in the GPU local memory 120 on the display devices 110.

The GPU 118 includes one or more streaming multiprocessors 124. Each of the streaming multiprocessors 124 is capable of executing a relatively large number of threads concurrently. Advantageously, each of the streaming multiprocessors 124 can be programmed to execute processing tasks relating to a wide variety of applications, including but not limited to linear and nonlinear data transforms, filtering of video and/or audio data, modeling operations (e.g., applying of physics to determine position, velocity, and other attributes of objects), and so on. Furthermore, each of the streaming multiprocessors 124 may be configured as a shading engine that includes one or more programmable shaders, each executing a machine code shading program (i.e., a thread) to perform image rendering operations. The GPU 118 may be provided with any amount of on-chip GPU memory 122 and GPU local memory 120, including none, and may employ on-chip GPU memory 122, GPU local memory 120, and system memory 104 in any combination for memory operations.

The on-chip GPU memory 122 is configured to include GPU programming code 128 and on-chip buffers 130. The GPU programming 128 may be transmitted from the GPU driver 116 to the on-chip GPU memory 122 via the system data bus 132. The GPU programming 128 may include a machine code vertex shading program, a machine code geometry shading program, a machine code fragment shading program, or any number of variations of each. The on-chip buffers 130 are typically employed to store shading data that requires fast access in order to reduce the latency of the shading engines in the graphics pipeline. Since the on-chip GPU memory 122 takes up valuable die area, it is relatively expensive.

The GPU local memory 120 typically includes less expensive off-chip dynamic random access memory (DRAM) and is also employed to store data and programming employed by the GPU 118. As shown, the GPU local memory 120 includes a frame buffer 126. The frame buffer 126 stores data for at least one two-dimensional surface that may be employed to drive the display devices 110. Furthermore, the frame buffer 126 may include more than one two-dimensional surface so that the GPU 118 can render to one two-dimensional surface while a second two-dimensional surface is employed to drive the display devices 110.

The display devices 110 are one or more output devices capable of emitting a visual image corresponding to an input data signal. For example, a display device may be built using a cathode ray tube (CRT) monitor, a liquid crystal display, or any other suitable display system. The input data signals to the display devices 110 are typically generated by scanning out the contents of one or more frames of image data that is stored in the frame buffer 126.

FIGS. 2A-2E are illustrative diagrams of one embodiment of a 3D clipmap 200. 3D clipmap 200 includes five LODs. Three LODs are mip levels, including mip level 250, mip level 240, and mip level 230. Two of the five LODs are clip levels, which include clip level 220 and clip level 210. Alternate embodiments of 3D clipmap 200 can include any number of mip levels and clip levels, so long as it includes at least one clip level and at least one mip level. The coarsest LOD in 3D clipmap 200 defines the spatial extents of the spanned region, a volume 260, making it a mip level. The finest LOD in 3D clipmap 200 must be a clip level, otherwise 3D clipmap 200 would simply be a mipmap.

Mip level 250 is the coarsest LOD in 3D clipmap 200 and includes a single voxel that represents the full spatial extent spanned by 3D clipmap 200, volume 260. Consequently, mip level 250 requires the least memory to store. Mip level 240 doubles the resolution in each dimension with respect to mip level 250, making the resolution eight voxels. Mip level 230 again doubles the resolution in each dimension with respect to mip level 240, making the resolution 64 voxels. As resolution increases from mip level 250, to mip level 240, to mip level 230, the memory necessary to store those LODs also increases. The spatial regions, or volumes, spanned by mip level 250, mip level 240, and mip level 230 are the same.

Clip level 220 maintains the 64 voxel resolution of mip level 230, increases the detail represented, and decreases the spatial region represented by the LOD. In a 3D mipmap representation, the resolution would again double in each dimension. However, 3D clipmap 200 clips voxels outside the maximum size for each dimension, thereby leaving a portion of the full spatial extent, volume 260, unrepresented in clip level 220. Clip level 220 is centered about a viewpoint, which is located where the octants of clip level 220 meet.

Clip level 210 is the finest LOD in 3D clipmap 200 and also maintains the 64 voxel resolution of mip level 230 and clip level 220. Clip level 210 increases the detail represented relative to clip level 220 and decreases the spatial region represented by the LOD. Clip level 210 leaves a larger portion of the full spatial extent, volume 260, unrepresented than clip level 220 and is centered about the same viewpoint.

Figure 3A:
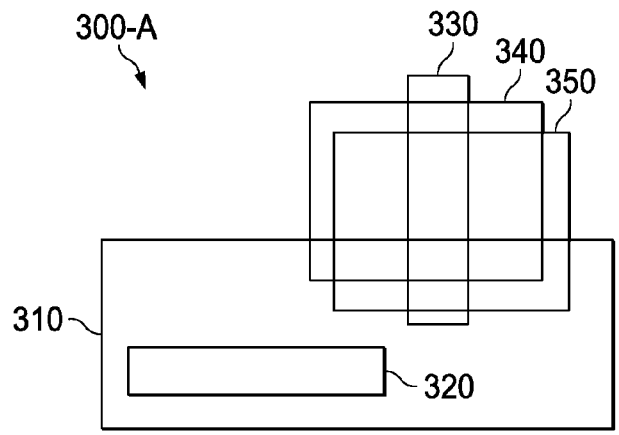
FIGS. 3A and 3B are diagrams illustrating unification of regions in a scene.
Figure 3B:
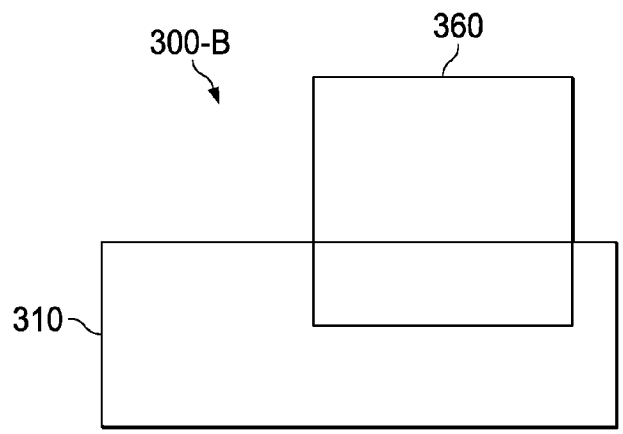

FIGS. 3A and 3B are diagrams illustrating how one embodiment of the graphics processing subsystem or method introduced herein may be employed to unify a plurality of regions. Diagram 300-A of FIG. 3A illustrates a collection of regions in a scene that require an update. In certain embodiments, the collection of regions is represented as a list of regions to be updated. The collection of regions includes a rectangle 310, a rectangle 320, a rectangle 330, a rectangle 340, and a rectangle 350. Note that rectangle 320 is contained entirely by rectangle 310. Also note the significant overlap of rectangle 330, rectangle 340, and rectangle 350. The overlap of rectangle 340 and rectangle 350 is common when a single object in the scene moves a small amount from one frame of the scene to the next. In that case, the region containing the object in the earlier frame requires an update, as does the region containing the new location.

Diagram 300-B of FIG. 3B illustrates the unification of the collection of regions of diagram 330-A into a new, or updated collection of regions to be updated. In certain embodiments, the new collection of regions is represented by a new, or updated list of regions in the scene to be updated. The new collection of regions includes rectangle 310, of diagram 300-A, and a bounding rectangle 360. Rectangle 310 is unchanged; however rectangle 320 is omitted from the new collection. The summed volume of rectangle 310 and rectangle 320 is greater than the bounding region volume for rectangle 310 and rectangle 320, which, in this example, is rectangle 310. Therefore, rectangle 310 and rectangle 320 are unified into a bounding region equivalent to rectangle 310.

Bounding rectangle 360 bounds rectangle 340, rectangle 350, and rectangle 330. Rectangle 340 and rectangle 350 overlap significantly, which indicates the difference between their summed volume and a bounding region volume would be large. Similarly, a summed volume of rectangle 330 and the bounding rectangle for rectangle 340 and rectangle 350 is also larger than the bounding rectangle for rectangle 330, rectangle 340, and rectangle 350. The result of that unification is bounding rectangle 360.

In the example of FIG. 3, bounding rectangle 360 and rectangle 310 are not unified, although the two rectangle overlap. A bounding rectangle for bounding rectangle 360 and rectangle 310 would have a volume that is larger than the summed volume of bounding rectangle 360 and rectangle 310. Therefore, no unification is carried out.

Figure 4:
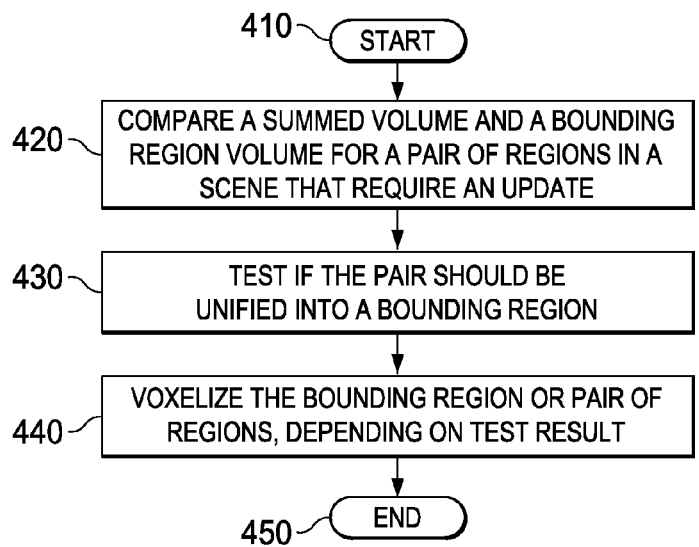
FIG. 4 is flow diagram of one embodiment of a method of updating a voxel representation of a scene.

FIG. 4 is a flow diagram of one embodiment of a method for updating a voxel representation of a scene. The method begins in a start step 410. The voxel representation contains at least a pair of regions in the scene that require an update. In certain embodiments a list of regions in the scene is received, typically from an application executing on a CPU. In the embodiment of FIG. 4, in a comparison step 420, a summed volume and a bounding region volume for the pair of regions are compared. In certain embodiments, the comparison includes evaluating a difference between the summed volume and the bounding region volume. In alternate embodiments, where a list of regions to be updated is given, comparison step 420 is carried out for each combination pair of regions in the list.

Continuing the embodiment of FIG. 4, in a testing step 430, the pair of regions is tested to determine if the pair should be unified into a bounding region. Testing step 430, in certain embodiments, includes using the difference between the summed volume and the bounding region volume to determine if the summed volume exceeds the bounding region volume, which would be indicated by a positive value for the difference. In alternate embodiments, testing step 430 includes using the difference to determine if the bounding region volume exceeds the summed volume by more than a tolerance. For example, in certain embodiments, the tolerance can be zero. In those embodiments, the pair of regions would only be unified into the bounding region if the bounding region volume were at most the same volume as the summed volume. In other embodiments, the tolerance can be negative. In those embodiments, the pair of regions would only be unified into the bounding region if the bounding region volume were smaller than the summed volume.

In certain embodiments, where a list of regions to be updated is given, testing step 430 also includes ensuring the number of regions in the original list is not exceeded by an updated list that includes the bounding region and excludes the pair of regions. In certain embodiments a tolerance can be employed such that the number of regions in the updated list does not exceed the number of regions in the original list by more than the tolerance. In some embodiments the tolerance is zero. In other embodiments, the tolerance allows for one or more additional regions in the updated list relative to the original list.

Continuing the embodiment of FIG. 4, in a voxelization step 440, the bounding region or the pair of regions is voxelized, depending upon the result of the test of the step 430, to update the voxel representation of the scene. In embodiments where a list of regions to be updated is given, the comparing step 420 and testing step 430 are repeated iteratively on the updated list of regions to be updated until no combination pair of regions meets the requirements for unifying into a bounding region. In certain embodiments, the unification is carried out sequentially, first unifying the combination pair offering the largest difference between summed volume and bounding region volume while still meeting the requirements of testing step 430. When testing step 430 indicates no further unifications are available, each region in the latest updated list is voxelized, which includes voxelizing the new bounding regions and excludes any combination pairs that have been unified. The method then ends in an end step 450.

Those skilled in the art to which this application relates will appreciate that other and further additions, deletions, substitutions and modifications may be made to the described embodiments.

What is claimed is:

1. A graphics processing subsystem, comprising:
   a memory configured to store a three-dimensional (3D) clipmap representation of a scene having first and second regions to be updated, said regions based on differing viewpoints of said scene; and
   a graphics processing unit (GPU) operable to:
   unify said first and second regions of said differing viewpoints into a bounding region if a volume thereof does not exceed summed volumes of said first and second regions by more than a tolerance, and
   generate voxels for said bounding region and cause said voxels to update said stored 3D clipmap representation.

2. The graphics processing subsystem as recited in claim 1 wherein said tolerance is zero.

3. The graphics processing subsystem as recited in claim 1 wherein said first and second regions contain at least one modified object.

4. The graphics processing subsystem as recited in claim 1 wherein an intersection of said first and second regions is non-zero.

5. A method of updating a stored three-dimensional (3D) clipmap representation of a scene, comprising:
   comparing a summed volume and a bounding region volume for a pair of regions in the scene that require an update, said regions based on differing viewpoints of said scene;
   testing if said pair should be unified into a bounding region; and
   voxelizing said bounding region, thereby updating said stored 3D clipmap representation.

6. The method as recited in claim 5 further comprising receiving a list of a plurality of regions of said scene that require an update, wherein said list includes said pair.

7. The method as recited in claim 6 further comprising generating a new list of at least one region of said scene that requires an update, wherein said list includes said bounding region and excludes said pair.

8. The method as recited in claim 7 wherein said testing includes ensuring the number of regions in said new list does not exceed the number of regions in said old list by more than a tolerance.

9. The method as recited in claim 5 further comprising writing voxels generated by said voxelization to a 3D clipmap representation data structure corresponding to said 3D clipmap voxel representation.

10. The method as recited in claim 5 wherein said comparing includes computing a difference between said summed volume and said bounding region volume.

11. The method as recited in claim 8 wherein said testing includes employing said comparing in determining if said summed volume exceeds said bounding region volume.

12. A computing system, comprising:
    a memory configured to store a three-dimensional (3D) clipmap data structure having a plurality of levels of detail (LODs) for representing a scene;
    a central processing unit (CPU) operable to execute an application configured to generate an original list of a plurality of regions of said scene that require an update, said regions based on differing viewpoints of said scene; and
    a graphics processing unit (GPU) operable to:
    evaluate a difference between a summed volume and a bounding region volume for each combination pair of regions in said original list,
    unify a pair of regions of said differing viewpoints into a bounding region if a corresponding difference is indicative that a corresponding summed volume exceeds a corresponding bounding region volume,
    modify said original list into a new list that includes said bounding region and excludes said pair, and
    voxelize said bounding region into said 3D clipmap data structure, thereby updating said 3D clipmap data structure.

13. The computing system as recited in claim 12 wherein said GPU is further operable to ensure the number of regions in said new list does not exceed the number of regions in said original list by more than a tolerance.

14. The computing system as recited in claim 12 wherein said GPU is further operable to re-evaluate said difference for each combination pair of regions in said new list.

15. The computing system as recited in claim 12 wherein said GPU is further configured to clear the contents of regions in said new list.

16. The computing system as recited in claim 12 wherein said GPU is further configured to voxelize each region in said new list.

17. The computing system as recited in claim 12 wherein said GPU is further configured to cause respective differences to be arranged in a square matrix of differences and stored in said memory.

* * * * *